(12) United States Patent
Petherbridge et al.

(10) Patent No.: US 12,264,723 B2
(45) Date of Patent: Apr. 1, 2025

(54) TOOTHED POWER TRANSMISSION BELT FOR USE IN OIL

(71) Applicant: GATES CORPORATION, Denver, CO (US)

(72) Inventors: Kirstie Petherbridge, Scotland (GB); Paul Pearson, Scotland (GB)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/890,237

(22) Filed: Aug. 17, 2022

(65) Prior Publication Data

US 2023/0076730 A1    Mar. 9, 2023

Related U.S. Application Data

(60) Provisional application No. 63/234,373, filed on Aug. 18, 2021.

(51) Int. Cl.
| | |
|---|---|
| *F16G 1/28* | (2006.01) |
| *B29D 29/08* | (2006.01) |
| *B32B 5/02* | (2006.01) |
| *B32B 25/10* | (2006.01) |
| *F16G 1/10* | (2006.01) |
| *F16G 1/21* | (2006.01) |

(52) U.S. Cl.
CPC .............. *F16G 1/28* (2013.01); *B29D 29/08* (2013.01); *B32B 5/024* (2013.01); *B32B 25/10* (2013.01); *F16G 1/10* (2013.01); *F16G 1/21* (2013.01); *B32B 2255/02* (2013.01); *B32B 2255/26* (2013.01); *B32B 2262/0269* (2013.01); *B32B 2307/306* (2013.01); *B32B 2307/51* (2013.01); *B32B 2307/536* (2013.01); *B32B 2433/00* (2013.01)

(58) Field of Classification Search
CPC ..... F16G 1/28; F16G 1/10; F16G 1/21; B29D 29/08; B32B 5/024; B32B 25/10
USPC .......................................................... 474/205
See application file for complete search history.

(56) References Cited

U.S. PATENT DOCUMENTS

| | | | | |
|---|---|---|---|---|
| 7,402,538 B2* | 7/2008 | Bader | ................... | D03D 15/52 |
| | | | | 428/920 |
| 9,927,001 B2* | 3/2018 | Di Meco | ............. | F16H 57/0489 |

(Continued)

FOREIGN PATENT DOCUMENTS

| DE | 102014203216 A1 * | 8/2015 | ............... F16G 1/10 |
|---|---|---|---|
| JP | 4995930 B2 * | 8/2012 | |
| WO | WO-2019181654 A1 * | 9/2019 | ............... D02G 3/28 |

OTHER PUBLICATIONS

JP 4995930 B2 English Translation from Google Patents (Year: 2012).*
JP 4995930 B2 Yamada et al. (Year: 2012).*

*Primary Examiner* — Henry Y Liu
(74) *Attorney, Agent, or Firm* — Kevin J. Aiken, Esq.

(57) ABSTRACT

A toothed power transmission belt suitable for use in contact with oil, having an elastomeric belt body, a helical wound tensile member embedded therein, and teeth on a pulley-contact surface with a jacket covering the teeth, wherein the jacket is a woven fabric with a smooth, continuous, outer rubber layer formed from a nitrile-containing elastomer compounded with at least one coagent, an RFS adhesion promoter, and with no fluoropolymer, and the fabric has para-aramid fibers in the weft, meta-aramid fibers in the warp, and no nylon fibers.

16 Claims, 2 Drawing Sheets

(56) References Cited

U.S. PATENT DOCUMENTS

| | | | |
|---|---|---|---|
| 2004/0002275 A1* | 1/2004 | Thakore | B32B 25/12 |
| | | | 442/409 |
| 2005/0059764 A1* | 3/2005 | Beck | B32B 25/10 |
| | | | 524/495 |
| 2011/0003659 A1* | 1/2011 | Wu | D03D 15/283 |
| | | | 474/268 |
| 2011/0111902 A1* | 5/2011 | Well | C08L 15/005 |
| | | | 474/204 |
| 2011/0237374 A1* | 9/2011 | Nakao | F16G 1/08 |
| | | | 474/205 |
| 2014/0080647 A1* | 3/2014 | Sakamoto | F16G 1/28 |
| | | | 474/205 |
| 2015/0005123 A1* | 1/2015 | Di Meco | F16G 9/04 |
| | | | 474/205 |
| 2019/0178339 A1* | 6/2019 | Gao | F16G 5/08 |
| 2019/0376579 A1* | 12/2019 | Wu | D03D 1/0094 |
| 2020/0141283 A1* | 5/2020 | Gao | F16H 55/171 |

\* cited by examiner

TOOTHED POWER TRANSMISSION BELT FOR USE IN OIL

BACKGROUND OF THE INVENTION

This invention relates generally to a toothed or synchronous belt, more particularly to a toothed belt having a special rubber coating on the contact surface for improved use in oil.

Endless toothed belts, also called timing belts or synchronous belts are often used in internal combustion engines to synchronize or time the valve movements with the crank and piston movements. They are also used to drive accessories such as oil pumps, water pumps, fuel injection pumps, balance shafts, and the like. Dry toothed belts on dry belt drives are mounted on the outside of the engine block and protected from oil contact. Dry belt drives require the crankshaft and cam shafts to pass through the engine wall and therefore generally require additional seals, covers and space. Wet belts or "belt-in-oil" ("BIO") belts and drives are situated within the engine block or similar oil-wet environment, eliminating the need for the additional seals and covers and offering the potential for space savings. Timing belt width and pulley widths and tensioner widths largely determine the space requirement. To minimize belt width, the belt must have very high durability, including resistance to flex fatigue under the load conditions and bending radii of the drive, resistance to abrasion and wear, and resistance to the environmental conditions of heat and continuous contact with oil. Wear resistance is particular important because wear debris remains in the oil, and if severe, can prematurely clog oil filters causing engine damage.

U.S. Pat. Pub. No. 2020/0141283 A1, the contents of which are hereby incorporated by reference, discloses a BIO system. The disclosed belt includes various conventional oil-resistant materials, including a treated fabric covering the teeth.

U.S. Pat. Pub. No. 2014/0080647 A1 discloses a fabric treatment including a hardened epoxy or epoxy-rubber treatment, with optional RFL (i.e., resorcinol-formaldehyde-latex) treatment. Such a treatment is intended to improve the wear resistance and oil and water-resistance of a tooth jacket, and to provide a toothed belt that has satisfactory durability even when used under high-temperature and high-load conditions or within an oil or water environment.

JPH06101741A discloses a toothed belt with the surface of the cover fabric covered with a rubber layer formed from a rubber paste. The rubber layer is easily thermally deteriorated relative to the belt body, and therefore hardens in the initial short time on start of use, thus reducing the friction coefficient and reducing abrasion.

U.S. Pat. No. 9,927,001 B2 describes a toothed belt with a covering fabric that is resistant to high temperatures, when dry and particularly in oil, having four fabric treatments said to be treatments extremely advantageous for a long belt life in continuous contact with oil at high temperatures. The fourth and outer layer includes an anti-friction material, preferably a fluorinated polymer such as PTFE (i.e., polytetrafluoroethylene). Likewise, U.S. Pat. No. 8,568,260 B2 discloses a toothed belt for use with oil having an outer layer based on a fluorinated plastomer present in a greater amount than another elastomeric material. U.S. Pat. Pub. No. 2011/0111902 A1 also discloses a toothed belt with an oil-resistant, fluorinated, protective layer made from PTFE, PVF (i.e., polyvinylfluoride), or PVDF (i.e., polyvinylidene-fluoride).

SUMMARY OF THE INVENTION

The present invention is directed to systems and methods which provide a smooth, continuous, rubber, tooth-surface coating containing no fluoropolymers, no lubricants such as graphite or moly, of the same or similar composition as the belt body and with as good or better thermal resistance as the belt body, or which provide a durable toothed belt for BIO applications and drives.

The invention is directed to a toothed power transmission belt having an elastomeric belt body with a helical wound tensile member embedded therein, and teeth on a pulley-contact surface with a jacket covering the teeth. The jacket is a woven fabric coated on the external side with an oil and heat resistant rubber composition defining a generally smooth, continuous, outer rubber layer.

The oil and heat resistant rubber composition may be based on nitrile-containing elastomers with coagents, adhesion promoters, but no fluoropolymer additives. The outer rubber layer may be of equal or better heat resistance compared to the belt body, and softer as measured by a rubber hardness test. The oil and heat resistant rubber composition may have no graphite, molybdenum lubricant ingredient as well as no fluoropolymer. The composition may include one or more coagents and a resorcinol-methylene donor-silica ("RFS") adhesion promotor system.

The fabric may have a treatment based on epoxy or epoxy-rubber. The jacket may be coated on the internal side with an adhesive rubber composition, which may have the same composition as the oil and heat resistant rubber composition. All these rubber compositions may be based on an oil resistant nitrile elastomer, such as hydrogenated nitrile rubber ("HNBR").

The fabric may be woven of heat resistant and oil resistant fibers, such as aramid fibers, but it has no nylon fibers. The fabric may have para-aramid in the weft and meta-aramid in the warp. The weft may include elastic yarn for improving stretchability.

The invention is also directed to a method of making a toothed belt for use in contact with oil. The method includes providing a woven fabric as described above, applying one or more treatments such as those described above, and finally applying the outer rubber layer as described above to make a jacket. The jacket is then molded along with belt body materials and tensile cord to make an endless toothed belt having a generally smooth, continuous, outer rubber layer on the toothed surface intended for contact with a pulley.

The invention is also directed to the jacket described above for use on the tooth surface of a belt for use in oil.

The outer rubber layer or coating increases durability for a belt in oil thus allowing for a reduced belt width and reducing the generation of debris which contaminates the oil.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
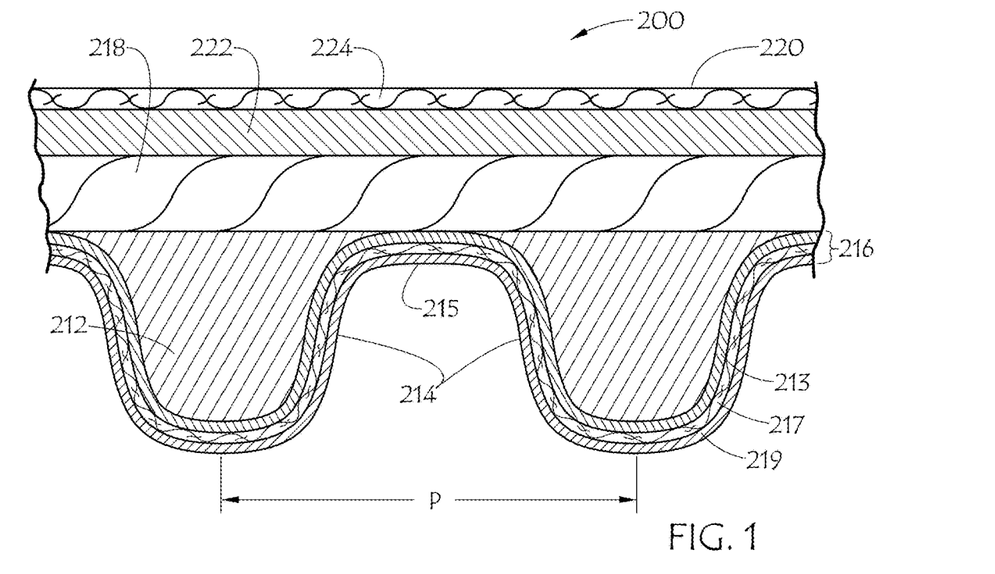
FIG. 1 is a partially fragmented perspective view of a toothed belt according to an embodiment of the invention.

The construction of inventive synchronous belt 200 is illustrated in FIG. 1. It should be understood that only a portion of the endless belt is shown in FIG. 1. Belt 200 includes teeth 214 on one side, which engage grooved sprockets or grooved pulleys. The teeth 214 alternate with lands 215. The curved transition from the flank of tooth 214 to land 215 is called the root or the tooth root. The belt 200 has no teeth on back side 220, although an alternate embodiment may have similar teeth on both sides. The body rubber or elastomer includes tooth rubber 212 and back rubber 222. The toothed side is covered with tooth jacket 216 and the back side 220 is covered with optional back jacket 224. The tooth repeat length is called the pitch, "P." The tensile member 218 is embedded in the belt body rubber and gives the belt its high modulus in tension.

The tooth jacket 216 includes a fabric 217, surface rubber layer 219, and one or more additional fabric treatments, such as adhesion layer 213. Jacket 216 is designed to enhance one or more belt properties, for example, adhesion, oil resistance, wear resistance, and the like, as well as system performance properties such as timing error and durability. The fabric treatments may be any suitable treatments known in the art. Likewise, the back jacket 224 may include a fabric and one or more of the same or different treatments as the tooth jacket. The term "jacket" is thus used to describe a fabric with one or more treatments included which is generally the form in which it is ready for assembly into the belt. "Fabric" generally refers to the greige woven, non-woven, or knit material before applying treatments, although some fiber treatment may be included.

The inventive belt exhibits excellent wear and abrasion resistance when used in oil-immersed or partially oil-immersed drives. The key features for this performance are surface rubber layer 219 and the fiber materials used in tooth fabric 217. The effect is synergistic, i.e., greater than the sum of the individual parts. By reducing wear and the debris generated by abrasion, the system is protected from the adverse effects of such debris. Conventional BIO systems have experienced failures in the field due to blockage of the oil filters by debris from the belt. By reducing wear or increasing durability, the belt life is also enhanced, or the belt can be made narrower, saving space in the engine.

The tooth fabric 217 may be any suitable woven, knit, or non-woven fabric of suitable stretch, strength, wear resistance, thermal resistance, and environmental resistance, as needed for the application. For use in a flow-through belt-building process, (defined later), a longitudinal stretch over 80%, or over 100%, is preferable. For a preform process, a much lower stretch may be suitable, or no significant stretch may be suitable. The fabric is preferably made only of high-strength, oil, wear and heat resistant fibers such as aramid, PPS, PEEK, polyester, and combinations thereof. Preferably the fabric is made only of aramid fibers and optionally with an elastic yarn component for stretchability. The aramid fibers or yarns may be para-aramid fibers or yarns or meta-aramid fibers or yarns or combinations thereof.

An exemplary weave for the fabric is a 2×2 twill or a 3×1 twill. Many other weave types are possible, however.

An exemplary woven fabric has a warp of meta-aramid yarns and a weft of para-aramid yarns. Para-aramid yarns may include co-polymer para-aramid yarns. The para-aramid yarns may include an elastic yarn component to provide stretch in the weft direction. The elastic yarn may be rubber elastic or polyurethane elastic yarn. Elastic means highly stretchable, for example stretchable from 100-500% or more with a high degree of retraction. The weft direction is preferably the longitudinal direction in the final belt. These directions and materials may be reversed so that the stretch direction is the warp direction and is oriented in the longitudinal direction of the belt. Yarns of sufficient stretch may be obtained by any known suitable method for the chosen fibers, including texturizing, wrapping an elastic core, orienting on a bias, and combinations thereof. Wrapping the aramid on an elastic core is preferred for the weft yarns or the stretch direction. Nylon or polyamide fibers are not suitable for use in this invention, neither in the weft nor warp. Thus, nylon 6-6, the predominant fiber in conventional automotive timing belt jackets, is not suitable for use in this invention.

Suitable para-aramid fibers include those sold under the trademark Kevlar by DuPont, those sold under the trademarks Twaron and Technora (a co-polymer) by Teijin Aramid, and those sold under the trademark Heracron by Kolon Industries. Suitable meta-aramid fibers include those sold under the trademark Nomex from DuPont and those sold under the trademark Conex from Teijin.

Surface rubber layer 219 is formed from an oil-resistant, heat-resistant rubber composition. The surface rubber composition may be based on any suitable highly oil-resistant elastomer, e.g., a nitrile-group containing copolymer elastomer such as nitrile-butadiene rubber (NBR), hydrogenated nitrile butadiene rubber (HNBR), carboxylated nitrile (XNBR or HXNBR), or the like. The nitrile-group containing elastomer may include a third monomer which lowers the glass transition of the rubber. Blends of different grades of nitrile-group containing elastomers may be used. Exemplary elastomers include the various grades sold under the trademark Zetpol by Zeon, including their so-called ZSC materials; and the various grades sold under the trademark Therban by Arlanxeo. Fluoroelastomers and fluoropolymers are not used in this invention.

The surface rubber composition may include any of a wide variety of compounding ingredients, including reinforcing fillers, plasticizers, anti-degradants, adhesion promoters, coagents, curatives and so on, in addition to the base elastomer. Exemplary reinforcing fillers include carbon black, silica, and short fibers. It is preferable to include one or more coagent such as zinc diacrylate or zinc dimethacrylate, which may be added during mixing of the composition or may be included in a grade of HNBR (e.g., as in Zeon's ZSC) which is used in the composition. Other acrylate or methacrylate coagents may be used alone or in combination. It is also preferable to include an adhesion promoter in the composition. A preferred adhesion promoter is a resorcinol- and/or formaldehyde-based resin, such as the products trade-marked Cohedur sold by Lanxess. The rubber composition may advantageously include a reactive resin system such as or equivalent to resorcinol, a formaldehyde or methylene donor, and silica which is commonly referred to as an "RFS" adhesion system, examples of which are disclosed in Th. Kempermann, et al., "Manual for the Rubber Industry," 2d Ed., Bayer A G, Leverkusen, Germany, pp 372 & 512-535 (1991) which is hereby incorporated herein by reference. The main purpose of this "RFS" system is to enhance adhesion between the fabric the outer rubber layer. Silica is also a reinforcing filler. A high surface-area silica is preferred. A peroxide cure system is preferred for its heat resistance.

The outer surface rubber composition may be applied to the tooth fabric or treated tooth fabric (see below) by any suitable method that results in a generally smooth, continuous coating that seals off any porosity present in the fabric. The outer rubber layer in the finished belt may be glossy or shiny, especially when oil wet, but is typically having a smooth, matte finish when dry. The outer rubber composition may be applied by making a liquid, rubber cement and brushing, spraying, coating, or dipping the cement onto the fabric. Alternately, the rubber composition may be applied as a solid rubber using a calendering or laminating process such as frictioning or skimming. Alternately, the outer rubber layer may be applied during a belt building process. A rubber thickness of 1 mil (25 μm) to 10 mils (0.25 mm) should be sufficient for laminating.

The outer rubber layer is believed to provide more chemical resistance and more wear resistance than prior art belt constructions. Filling the fabric texture and pores with rubber is believed to prevent particle/fluid entrapment or oil penetration ingression, and eliminated nylon is believed to increase chemical resistance. The outer rubber layer is also believed to improve composite integrity/robustness and may help inhibit root crack initiation at the rubber-jacket interface, inhibiting delamination, and increasing service life. The tooth jacket of this invention is also expected to have minimal dimensional change over lifetime with benefits for tooth meshing and noise generated.

The back fabric may be any suitable woven, knit, or non-woven fabric of suitable stretch, strength, wear resistance, thermal resistance (hot or cold), and environmental resistance for the application. Generally, there are no special requirements for any amount of stretch for the back fabric, since it will just lay flat on the back of the belt. Some degree of stretch may be preferred to maintain belt flexibility. Back fabric has been found to improve cold temperature resistance, reducing back cracking from repeated cold starts. The back fabric may be RFL treated. The back fabric is not required to be smooth or coated with a smooth, continuous rubber layer as the tooth fabric is, but it may be similarly coated.

A preferred fabric treatment for either or both the tooth fabric 213 and/or the back fabric 224 includes the epoxy or epoxy-rubber treatment, with an optional RFL treatment applied first, as described in U.S. Pat. Pub. No. 2014/0080647 A1 to Yamada et al., which is incorporated herein by reference. Such a treatment is intended to improve the wear resistance and oil and water-resistance of a tooth jacket, and to provide a toothed belt that has satisfactory durability even when used under high-temperature and high-load conditions or within an oil or water environment. The treatment may also improve adhesion of the fabric to the belt body and/or the outer rubber layer. The epoxy-rubber treatment may be the first treatment on the fabric. The rubber component may be an oil resistant latex such as NBR, HNBR, or XHNBR latex. The fabric treatment may be applied by dipping, spraying, brushing, roll coating, knife coating or other suitable process.

The treated tooth fabric, i.e., the jacket for covering the teeth of the inventive belt is thus preferably an aramid stretch fabric with no nylon fibers, first treated with an epoxy-rubber dip, followed by of the application of a smooth continuous outer rubber layer 219. Other layers may intervene, such as the aforementioned RFL, or other layers may be included on the inner surface for adhesion to the belt body materials or to the tooth rubber.

Any suitable rubber composition(s) may be used for the tooth rubber 212 or back rubber 222. In addition, there may be other layers of rubber as needed, such as an adhesion rubber layer in contact with the tensile cord 218, or other layers. The same or different compounds may be used in the tooth, in the tensile cord layer, on the back side and elsewhere in the belt, as desired. U.S. Pat. No. 6,358,171 B1 to Whitfield, which is hereby incorporated herein by reference, describes exemplary rubber compounds for the tooth rubber or belt body rubber. As described therein, the belt body rubber composition may include a nitrile-group containing copolymer elastomer such as HNBR and the elastomer may include a third monomer which lowers the glass transition of the elastomer. The rubber composition may also include from about 0.5 to about 50 parts by weight per 100 parts of elastomer ("PHR") of a fiber reinforcement. U.S. Pat. No. 9,140,329 B2, which is hereby incorporated herein by reference, describes other exemplary rubber compounds for the tooth rubber or belt body rubber. As described therein, the belt body rubber composition may include HNBR or HXNBR rubber, resorcinol, and a melamine compound.

The rubber composition(s) of the belt body, as well as the outer rubber layer, may furthermore include additional ingredients known in the art, such as fillers, plasticizers, anti-degradants, processing aids, curatives, coagents, compatibilizers, and the like.

The tensile cord 218 for the belt may be any known in the art, but preferably comprises fiber glass, PBO (i.e., poly p-phenylene-2,6-benzobisoxazole), aramid, carbon fiber or a hybrid of two or more of the foregoing. The tensile cord preferably includes an adhesive treatment that is highly resistant to oil for use in oil-wet environments. For example, the adhesive treatment may be based on nitrile containing latex or rubber, or other oil-resistant materials. A preferred tensile cord comprises carbon fiber such as disclosed in U.S. Pat. No. 6,945,891 to Knutson, or a glass/carbon hybrid cord such as described in U.S. Pat. No. 7,682,274 to Akiyama et al. Preferred fiber glass for a tensile cord comprises high-strength fiber glass such as K-glass, U-glass, M-glass, or S-glass.

The toothed belts of the invention may be manufactured according to known methods of making belts. The most common approach is to apply the various materials to a grooved mandrel, beginning with the tooth cover jacket, then the helical wound tensile cord or cords and the body rubber or rubbers, and ending with the back jacket. The mandrel with the belt slab is then inserted in to a pressurizable shell which can be heated and pressurized to squeeze the materials together, causing the rubber to flow into the teeth grooves pushing the tooth jacket into the shape of the grooves (known as the "flow-through" method). Alternately, the tooth jacket can be preformed into the approximate groove shape, optionally with tooth rubber filling the teeth, before or while placing the tooth jacket on the mandrel (the "preform method"). Other variations on these methods are also possible. The primary additional feature for making a fabric-backed belt is that the rubber layers must be carefully measured to obtain the desired final belt thickness, since the back of the belt cannot be ground to size as is often done for rubber-backed belts. The preform method may be preferred with the preferred aramid fabric, but either method may be used.

The rubber compound for the belt body generally has a modulus level which contributes significantly to the tooth stiffness and the load capacity of the tooth and the timing belt. The back rubber compound, if different from the tooth rubber, may be somewhat lower in modulus or softer to enhance belt flexibility since it does not carry load directly like the tooth rubber does. The tooth cover jacket contributes reinforcement to the tooth which also contributes to the tooth stiffness and load capacity of the belt. The tensile cord generally dominates the tensile properties of the timing belt, such as modulus (or span stiffness) and strength. Optimizing the combination of belt span stiffness and tooth stiffness by choice of these materials has been found to allow a narrower belt to have the same system timing error while reducing system loads and minimizing strength needed in the belt. See, for example, U.S. Pat. Pub. No. 2020/0141283 A1, the contents of which are incorporated herein by reference.

The outer rubber layer compound may advantageously be of lower modulus than the tooth or back rubber. The outer rubber layer is believed to cushion fabric as well as protect from oil penetration. A formulation that is somewhat softer (e.g., as measured by a rubber hardness tester such as Shore A or IRHD) than the tooth rubber and that retains that softness over the life of the belt in the presence of hot oil is advantageous.

EXAMPLES

How the present invention was discovered is an interesting story. It was noticed that there was excessive wear on BIO tests with the control construction when the belt width was reduced to save space. The control belt was a very good belt under the BIO conditions for which it was designed. The control belt includes a state-of-the-art fabric with high-performance nylon and p-aramid blended in the weft and nylon in the warp, and some special coatings on the fabric as described in U.S. Pat. Pub. 2014/0080647 A1 to Yamada et al. The special coatings are very oil resistant, so were expected to perform equally well under more severe BIO conditions. Instead, the belt life in a first experiment on BIO tests of increased severity was very disappointing, and excessive jacket wear was observed both on tooth flanks and in the land regions. Interestingly, it was further observed that a layer of rubber used to adhere the jacket to the belt body materials was not worn away. This rubber layer, designed for adhesion, had very good heat resistance and oil resistance, but nothing special to make it wear or abrasion resistant. This rubber layer had no PTFE, graphite lube, molybdenum disulfide, nor any other well-known friction modifiers.

This observation about the rubber layer led quickly to the idea of applying the same rubber layer to the outside of the belt. Unfortunately, when this second experiment was run, there was no positive effect in belt life or improvement in wear resistance in BIO testing.

Sometime later, it was discovered that the presence of nylon in the fabric could be detrimental to belt life in oil under severe conditions. Replacing the nylon with more para-aramid fiber or with meta-aramid fiber was found to approximately double the belt life in a third experiment. Even though the rubber layer had previously been found to have no positive effect, it was decided to try it again on the outside of a fabric having no nylon. Surprisingly, in the fourth experiment the outer rubber layer was found to more than double the belt life again, giving more than 6× improvement over the first two unsuccessful experiments. Thus, removing nylon and adding the rubber layer gave a synergistic effect unpredictable from the individual effects of the first three experiments.

Figure 2:
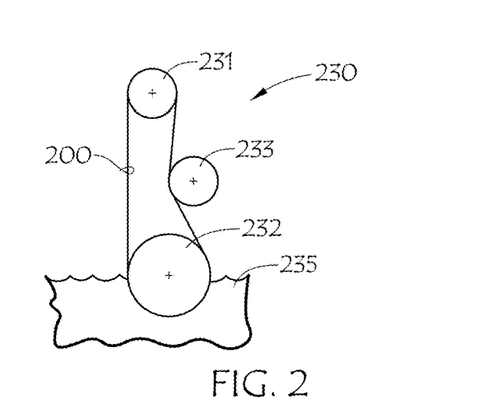
FIG. 2 is a schematic of the HOL test used to test the performance of embodiments of the invention in oil.

The above observations are reflected in the data in TABLE 1 and TABLE 2 below. TABLE 1 reports data from a Hot Oil Tester ("HOL") run at 140° C. and 18 kW and 6200 rpm. The driven pulley is approximately half-submerged in a bath 235 of Castrol motor oil. The drive layout 230 of the HOL tester is illustrated in FIG. 2. Pulley 231 is the driver with 20 grooves and pulley 232 is the driven sprocket with 40 grooves, both with RPX-profile grooves. The idler 233 has an outside diameter of 61 mm. The belt 200 tested is always 10-mm wide and has 85 teeth with 9.525-mm pitch and RPP tooth profile. The installation tension is 160 N. Comparative belt examples are indicated as "Comp. Ex." and inventive belt examples as "Ex."

TABLE 1 compares four belts tested at 18 kW on the HOL tester. The belt life in hours is normalized to account for variation between testers using the averages for a control belt tested multiple times on multiple testers. Comparing Comp. Ex. 1 and Comp. Ex. 2 shows that when nylon is present in the fabric, adding the inventive outer rubber layer does not improve the belt life. Comparing Comp. Ex. 3 to Comp. Ex's 1 and 2 shows that eliminating the nylon in favor of only aramid in the fabric a little more than doubles the belt life. However, combining both aramid-only fabric and the outer rubber layer in Ex. 4 results in 7-8 times the belt life compared to Comp. Ex's 1 and 2 and almost three times the belt life of Comp. Ex. 3. In other words, the outer rubber layer, surprisingly, only seems to produce a positive effect with fabric consisting of aramid, i.e., fabric with no nylon.

It is also significant to note that the failure mode of the inventive belt is improved. The comparative belts all fail with excessive flank and land wear, as well as delamination at some point, ultimately leading to tooth shear. The inventive belts tend to fail in a more generally acceptable way, with root cracks developing before any significant wear is seen. The root cracks in the inventive belt also lead to tooth shear, but the long life should give a user the opportunity to spot the cracks and replace the belt before catastrophic failure occurs, and the lack of land and flank wear means that the problem of wear debris is much improved if not eliminated.

TABLE 1

|  | Comp. Ex. 1 | Comp. Ex. 2 | Comp. Ex. 3 | Ex. 4 |
|---|---|---|---|---|
| Fabric weft | p-aramid/ nylon/elastic | p-aramid/ nylon/elastic | p-aramid/ elastic | p-aramid/ elastic |
| Fabric warp | nylon | nylon | m-aramid | m-aramid |
| First treatment(s) | Epoxy/ Latex | Epoxy/ Latex | Epoxy/ Latex | Epoxy/ Latex |
| Adhesive treatment | Rubber cement | Rubber cement | Rubber cement | Rubber cement |
| Outer rubber layer | none | Rubber cement | none | Rubber cement |
| HOL belt test life (hrs[1]) | 115 | 92 | 276 | 805 |
| Failure mode | Severe flank + land wear | Flank wear + land wear | Flank wear + land wear | Root cracks |

[1]Test conditions were 140° C., 18 kW, reporting an average of multiple tests and normalizing various testers to tester #5.

Figure 3:
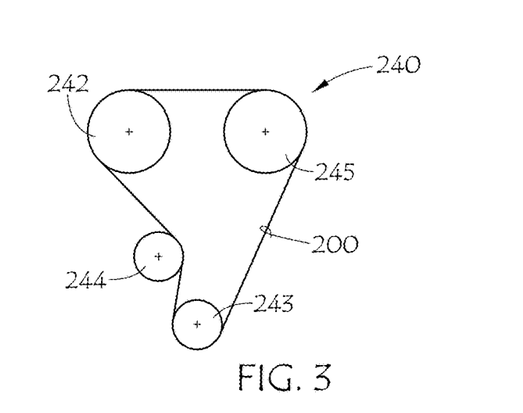
FIG. 3 is a schematic of a motored engine BIO drive used to test belt performance.

TABLE 2 reports data from a hot oil tester ("HOL") as described above but run at a higher load of 22 kW. It should be noted that at such higher loads, belt lives may be reduced below 100 hours, which may result in unreliable numerical comparisons and extrapolations due to excessively accelerated failure modes. Nevertheless, the trends seen in TABLE 2 are consistent with TABLE 1, and thus illustrative of the advantages of the invention. Comp. Ex. 1 and 6 are the same belt construction. Ex. 4 and 11 are the same inventive belt construction. Comp. Ex's 5-8 show that nylon in the fabric results in unacceptably short belt life. Comp. Ex. 9 shows that replacing the nylon with aramid improves the life somewhat. Ex's 10 and 11 show that the outer rubber layer on two different aramid fabrics results in significantly longer belt life (up to nine times longer). These two inventive belts differ in the aramid type used for the warp yarns of the fabric. Again, the failure mode of the belts shifts from severe wear and debris for the comparative belts to root cracks for the inventive belts. A comparison of Comp. Ex. 7 and 8 shows that use of a fluoroelastomer is no better than using a non-fluorinated polymer for the outer coating. The fluoroelastomer of Comp. Ex. 7 further included a PTFE powder additive, but still exhibited severe wear.

amount of time, 465 hours, then removed and inspected. For each of the examples in TABLE 3, the test layout was a dual overhead cam drive on a three-cylinder engine that was driven by an electric motor coupled to the crankshaft as illustrated in FIG. 3. The 3-cylinder engine is known as the 1.0 L Fox engine produced by Ford Motor Company. The stock oil-wet timing drive system was modified to accommodate the various test drives. For this comparison, all belts were 10 mm wide, with 116 teeth, and run oil-wet with Castrol Magnatec 5W-20 oil at an oil temperature of 140° C. The test layout 240, includes idler 244, and 19-groove driver or crank pulley 243 and two 38-groove driven cam pulleys 242, 245 with RPX groove profile and 9.525-mm pitch to match belt 200 which had an RPP tooth profile. The driver speed was 4750 rpm.

The results in TABLE 3 illustrate that the rubber layer can be varied, but not all compositions are equal. Comp. Ex. 12 shows that a rubber outer layer comprising HNBR with added PTFE has adhesion issues and unacceptable wear resistance. The adhesion issues are apparent at the end of the BIO test even though a compatible primer is used. Ex. 13 shows that a typical HNBR rubber composition with no fluoropolymer additives can resolve the wear issues, and therefore has some potential usefulness in BIO applications, but it may have some adhesion issues as well. Ex. 14 is another HNBR composition with a higher ACN level, which is expected to provide higher oil resistance than Comp. Ex. 12 or Ex. 13. Ex. 14 also has no fluoropolymer additive. Ex. 14 largely avoids the wear issues of Comp. Ex. 12, but still may have some room for improved adhesion or use of a primer. Again, Ex. 14 shows some potential usefulness with an adhesive primer. Ex. 15, which has the same outer rubber composition as Ex. 4 and 11 above, shows no adhesion issues, thanks to the RFS adhesion promotion ingredients. The wear resistance also shows no issues. It may be noted that the outer rubber cement used in Ex. 8, 10, 11 and 15 is the same as the adhesive rubber cement in all examples.

Figure 4:
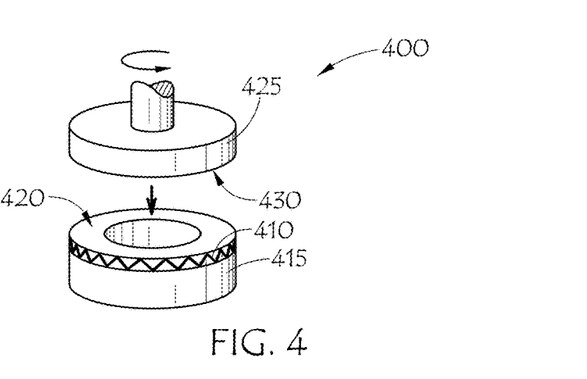
FIG. 4 is a schematic of a Drill Press Wear Test.

The materials in TABLE 3 were also tested on a dry abrasion test called the Drill Press Test. FIG. 4 illustrates the Drill Press Test 400 as used herein. In this test, the jacket is

TABLE 2

|  | Comp. Ex. 5 | Comp. Ex. 6 | Comp Ex. 7 | Comp. Ex. 8 | Comp. Ex. 9 | Ex. 10 | Ex. 11 |
|---|---|---|---|---|---|---|---|
| Fabric weft | nylon | p-aramid/ nylon/elastic | p-aramid/ nylon/elastic | p-aramid/ elastic | p-aramid/ elastic | p-aramid/ elastic | p-aramid/ elastic |
| Fabric warp | nylon | nylon | nylon | nylon | m-aramid | Spun p-aramid | m-aramid |
| First treatment(s) | Epoxy/ Latex | Epoxy/ Latex | Epoxy/ Latex | Epoxy/ Latex | Epoxy/ Latex | Epoxy/ Latex | Epoxy/ Latex |
| Adhesive treatment | Rubber cement | Rubber cement | Rubber cement | Rubber cement | Rubber cement | Rubber cement | Rubber cement |
| Outer rubber layer | none | none | Fluoro- elastomer | Rubber cement | None | Rubber cement | Rubber cement |
| HOL belt test life (hrs[1]) | — | 1.3 | 6[2] | 7 | 8.4 | 30 | 82 |
| Failure mode | Severe flank + land wear | Severe flank + land wear | Severe flank wear + adhesion failure | Flank wear + land wear | Flank wear + land wear | Flank wear | Root cracks |

[1]Test conditions were 140° C., 22 kW, reporting an average of multiple tests and normalizing various testers to tester #5.
[2]Test condition was 140° C., 18 kW.

TABLE 3 reports on four different belts having different outer rubber layer compositions, but otherwise all with the same construction as Ex. 4 and Ex. 11 above. These belts were run on a motored engine test as described in U.S. Pat. Pub. No. 2020/0141283 A1. The belts were run for an equal cut into a 1.1-inch (28 mm OD) circle with a 0.75-inch (19 mm ID) hole. The resulting jacket ring 410 is vulcanized to a rubber substrate 415. The jacket contact surface 420 is abraded by the counterface 430 of a rotating aluminum disk 425 at approximately 200 rpm under a contact force of 7 kg for 72 hours. The weight loss is indicative of the wear resistance of the jacket and the amount of debris generated by the sample.

Not surprisingly, the PTFE in Comp. Ex. 12 makes it the most lubricious in this dry test. But surprisingly, Ex. 13 and Ex. 15 are almost as good, losing only slightly more weight than Comp. Ex. 12. The inventive jackets and belts may thus also have usefulness in dry belt applications as well as oil-wet applications.

TABLE 3

|  | Comp. Ex. 12 | Ex. 13 | Ex. 14 | Ex. 15 |
|---|---|---|---|---|
| Primer present | Yes | No | Yes | No |
| Outer rubber layer | HNBR + PTFE | HNBR | High-ACN HNBR | HNBR + RFS |
| MER belt test time (hrs[1]) | 465 | 465 | 465 | 465 |
| Observations | Severe flank wear, no land wear, adhesion issues | Adhesion issues | Land wear, adhesion issues | No issues |
| Drill press wt. loss (g) | 0.0664 | 0.0683 | 0.1181 | 0.0741 |
| Shore D Hardness | 52.5 | 47.5 | 56.5 | 29 |

[1]Belts were removed at a fixed time for inspection and comparison.

A useful and preferred range of compositions for the outer rubber layer may be summarized as follows. This description is not intended to be limiting because many ingredients may be substituted for, others included, and some omitted according to the needs of a particular application. The base elastomer may be HNBR having an ACN content in the range of 35 to 45% by weight, an unsaturation level in the range of 0 to 10%, or preferably 0 to 4%. Acrylate and methacrylate coagent(s) may be present in the range of 0 or 5 to 40 PHR, preferably 10 to 30 PHR. The reinforcing filler(s) may be carbon black and/or silica in the range of 20 to 80 PHR, preferably 30 to 70 PHR, preferably with 30 to 50 PHR silica. Antioxidants, process aids, peroxide curatives and compatible plasticizers may be added as desired for handling and physical properties. The adhesion promoting system may include from 0.5, 1, or 2 up to 10 PHR of resorcinol and methylene donor ingredients, similar amounts of maleic anhydride-based materials, or other adhesion promoting materials or systems.

As for physical properties, the outer rubber layer may be similar in many respects to the typical HNBR rubber formulation used in timing belt bodies, with a few notable differences. Oil and heat resistance should be excellent for both belt body and outer layer. It is believed advantageous for the outer layer to be somewhat softer than the body rubber to facilitate a cushioning effect for the jacket when it contacts the pulley. TABLE 4 compares the hardness for the tooth rubber, back rubber, and the outer rubber layer used for the belts of Ex. 4, 11, and 15. The outer rubber layer starts out softer than the other belt rubber components and stays softer even after hot air heat aging for 168 hours at 150° C. The outer layer is generally lower in stiffness or modulus when the tooth or back rubber is fiber loaded and the outer layer has no fiber. TABLE 3 also supports the idea that a softer outer rubber layer is better than a harder layer, although many other factors are also different in that table.

TABLE 4

| Shore A hardness | Tooth rubber | Back rubber | Outer Layer |
|---|---|---|---|
| Original | 91 | 85 | 79 |
| Aged 168 hours @ 150° C. | 93 | 90 | 86 |

Not intending to be bound or limited by any explanation, it is believed that the benefits of the rubber layer for BIO applications cannot be achieved as long as nylon is present in the fabric due to poor hot-oil resistance of the nylon, relative to aramid. Furthermore, the presence of PTFE or other lubricating additives seems to be unnecessary because of the lubrication already present in an oily environment. Thus, even though such lubricating additives are known to have very good heat resistance and promote wear resistance, they are simply not as helpful for BIO applications as one might think, and they can actually cause adhesion issues and reduce wear resistance. Finally, traditional treatments on fabric tend to coat the fibers and/or follow the contours of the weave, leaving pores through which oil can penetrate or pockets where oil can persist, while the present rubber layer completely seals the fabric and provides a smooth, oil-resistant finish on the belt teeth and lands.

Figure 5:
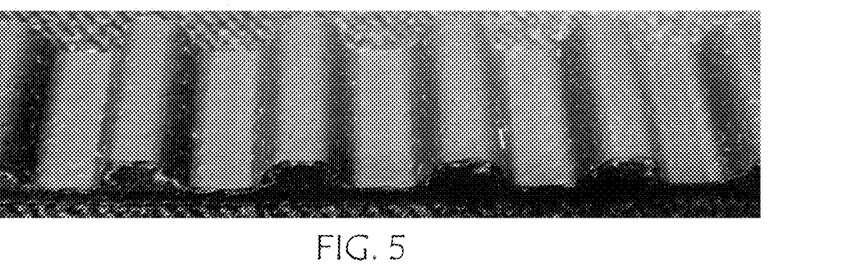
FIG. 5 is a photo of a portion of a new belt according to an embodiment of the invention.
Figure 6:
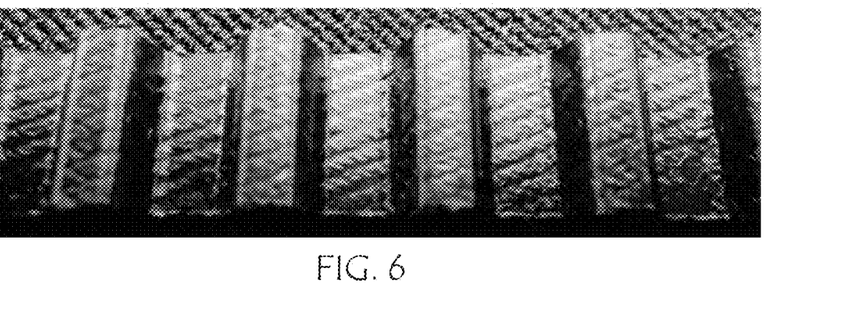
FIG. 6 is a photo of a portion of the belt of FIG. 5 after some time on test.
Figure 7:
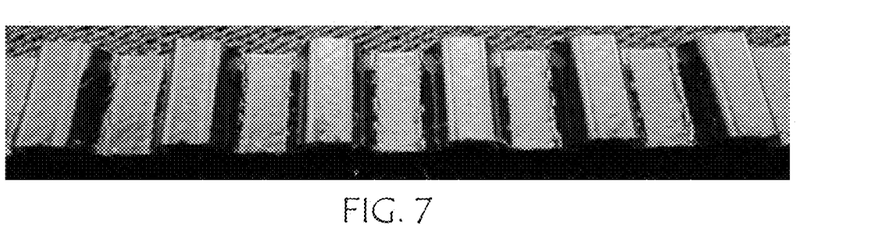
FIG. 7 is a photo of the belt of FIG. 6 after more time on test.
Figure 8:
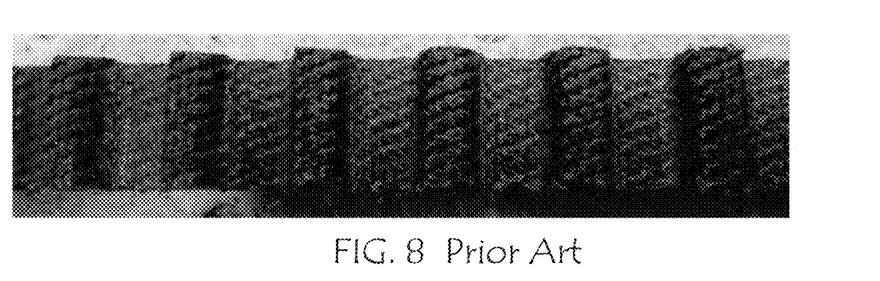
FIG. 8 is a photo of a portion of a prior art belt after some time on test.

FIG. 5 is a photograph of a portion of the belt of Ex. 4, 11 and 15, before testing or exposing to oil. FIG. 6 is a photograph of the same belt showing a glossy, smooth surface provided by the outer rubber layer after 107 hours on the MER test. The glossy surface is very apparent due to the oil in the test. An unused, new belt surface or a slightly used belt like this one may show evidence (such as some waviness) of the underlying fabric weave, but is generally quite smooth and continuous. FIG. 7 shows a portion of the Ex. 15 test belt after 465 hours on the MER test. Again, the pulley contact surface, including the teeth and the lands, is very smooth and glossy and there is no sign of the fabric being exposed. In contrast, FIG. 8 shows a portion of a prior art belt (like Comp. Ex. 9), without an outer rubber coating on the pulley contact surface, after about 152 hours on the MER test. The fabric is not glossy even though tested in oil, the fiber coating does not fill in the weave and the surface is not continuous and smooth as in the inventive belts.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A toothed power transmission belt comprising:
    an elastomeric belt body with a helical wound tensile member embedded therein; and teeth on a pulley-contact surface with a jacket covering the teeth;

said jacket comprising:

a woven fabric, comprising no nylon fibers, with a first fabric treatment based on epoxy or epoxy-rubber, and then coated on the external side with an oil and heat resistant rubber composition defining a smooth, continuous, outer rubber layer, wherein the oil and heat resistant rubber composition comprises no fluoropolymer or fluoroelastomer component.

2. The belt of claim 1 wherein the oil and heat resistant rubber composition comprises the same base elastomer as the belt body.

3. The belt of claim 1 wherein the outer rubber layer comprises heat resistance equivalent to or better than the elastomeric belt body.

4. The belt of claim 1 wherein the oil and heat resistant rubber composition comprises no graphite or molybdenum lubricant ingredient.

5. The belt of claim 1 wherein the jacket further is coated on the internal side with an adhesive rubber composition.

6. The belt of claim 5 wherein the adhesive rubber composition has the same composition as the oil and heat resistant rubber composition.

7. The belt of claim 6 wherein the belt body, the adhesive rubber composition, and the oil and heat resistant rubber composition comprise an oil resistant nitrile elastomer.

8. The belt of claim 7 wherein the oil and heat resistant rubber composition comprises HNBR elastomer and an RFS adhesion promotor system.

9. The belt of claim 1 wherein the fabric comprises aramid fibers.

10. The belt of claim 9 wherein the aramid fibers comprise meta-aramid fibers in the warp and para-aramid fibers in the weft.

11. The belt of claim 10 wherein the fabric further comprises an elastic yarn in the weft.

12. The belt of claim 1 wherein the outer rubber layer exhibits a lower durometer hardness than the elastomeric belt body.

13. A jacket for a toothed belt for use in contact with oil comprising:

a woven fabric consisting of para-aramid yarn and an elastic yarn in the weft and consisting of meta-aramid yarn in the warp, the elastic yarn not consisting of nylon;

an epoxy or epoxy-rubber treatment on the fibers of said woven fabric;

an adhesive rubber coating on one side of the epoxy-treated fabric, said one side intended for contact with the body of the toothed belt;

a smooth, continuous rubber layer on the opposite side of the epoxy-treated fabric, said opposite side intended for contact with a pulley;

said rubber layer comprising a heat-resistant and oil-resistant nitrile rubber composition with no fluoropolymer ingredient.

14. A method of making a toothed belt for use in contact with oil comprising:

providing a woven fabric consisting of para-aramid yarn and an elastic yarn in the weft and consisting of meta-aramid yarn in the warp, the elastic yarn not consisting of nylon;

applying an epoxy or epoxy-rubber treatment on the fibers of said woven fabric;

applying an adhesive rubber coating on one side of the epoxy-treated fabric, said one side intended for contact with the body of the toothed belt;

applying a heat-resistant and oil-resistant nitrile rubber composition with no fluoropolymer ingredient on the opposite side of the epoxy-treated fabric to form a jacket; and molding said belt with said jacket covering the teeth of said toothed belt, with said heat-resistant and oil-resistant nitrile rubber composition defining a glossy, smooth, continuous, outer rubber layer on the toothed surface intended for contact with a pulley.

15. The belt of claim 1 wherein the oil and heat resistant rubber composition is not epoxy-based.

16. The belt of claim 1 wherein the oil and heat resistant rubber composition consists of one or more ingredients selected from the group consisting of (any suitable highly oil resistant elastomer without fluorine, a nitrile-group containing copolymer elastomer, hydrogenated nitrile butadiene rubber, carboxylated nitrile, a nitrile-group containing elastomer which includes a third monomer, blends of different grades of nitrile-group containing elastomers, reinforcing fillers, plasticizers, anti-degradants, adhesion promoters, coagents, curatives, resorcinol- and/or formaldehyde-based resin, carbon black, silica, and short fibers).

* * * * *